United States Patent [19]

Iwane et al.

[11] Patent Number: 5,030,003
[45] Date of Patent: Jul. 9, 1991

[54] APPARATUS FOR MEASURING OPTICAL CHARACTERISTIC OF SPECTACLES

[75] Inventors: Toru Iwane, Yokohama; Yasuyuki Aikawa, Tokyo, both of Japan

[73] Assignee: Nikon Corporation, Tokyo, Japan

[21] Appl. No.: 511,787

[22] Filed: Apr. 20, 1990

[30] Foreign Application Priority Data

Apr. 27, 1989 [JP] Japan .................................. 1-108067

[51] Int. Cl.$^5$ .................................................. G01B 9/00
[52] U.S. Cl. ..................................... 356/125; 356/244; 33/200
[58] Field of Search ........................... 356/121–127, 356/244; 33/200

[56] References Cited

U.S. PATENT DOCUMENTS 3,002,285 10/1961 Wright ................................. 356/125
4,098,002 7/1978 Campbell et al. ................... 356/127
4,410,267 10/1983 Shindow et al. .................... 356/125

Primary Examiner—Richard A. Rosenberger
Assistant Examiner—Hoa Pham
Attorney, Agent, or Firm—Shapiro and Shapiro

[57] ABSTRACT

A spectacle lens right/left determination apparatus used in an optical characteristic measurement apparatus for checking and measuring optical characteristic of spectacle lenses, comprises a contact plate which has contact surfaces which are brought into contact with an eye-rim of one spectacle lens to be measured and an eye-rim of the other spectacle lens not to be measured when the spectacle lens to be measured, whose central portion is mounted on and fixed to the optical characteristic measurement apparatus, is inserted in a measurement optical path of the optical characteristic measurement apparatus; a first strain sensor, fixed to the contact plate, for, when a left-eye lens is present on the measurement optical path and the eye-rim of a right-eye lens is brought into contact with the contact surface, detecting a strain of the contact plate; a second strain sensor, fixed to the contact plate, for, when the right-eye lens is present on the measurement optical path and the eye-rim of the left-eye lens is brought into contact with the contact surface, detecting a strain of the contact plate; and electrical circuit for determining the right- or left-eye lens in the measurement optical path on the basis of the outputs from the first and second strain sensors.

11 Claims, 3 Drawing Sheets

loading

APPARATUS FOR MEASURING OPTICAL CHARACTERISTIC OF SPECTACLES

BACKGROUND OF THE INVENTION

1. Field of the Invention

The present invention relates to an apparatus for checking and measuring powers, and other optical constants of lenses of spectacles and, more particularly, to an automatic right/left determination apparatus for lenses of spectacles upon checking and measurement executed when lenses are fitted in a frame.

2. Related Background Art

As a conventional right/left determination apparatus for lenses of spectacles equipped in an optical characteristic measurement apparatus for spectacles, the following apparatuses are known: (1) an apparatus which comprises a spectacle frame holding member which can horizontally slide while holding a central bridge portion of a frame of spectacles, and determines a right or left lens upon movement of the spectacle frame holding member; (2) an apparatus in which a pair of right and left microswitches each having a lever-like contact portion are arranged on a contact plate which serves as a reference for determining a right/left position of a lens frame, and a right or left lens is determined upon contact between a temple of spectacles and the contact portion of the right or left microswitch; and (3) an apparatus in which a pair of right and left push buttons such as contact switches are arranged on the contact plate, and a right or left lens is determined upon contact between an eye-rim opposite to a lens present on a measurement optical path, and the push button.

However, in the conventional apparatuses, the following problems are posed. That is, in the right/left determination apparatus (1), the structure is complex, and a mounting operation for setting the bridge portion of the frame of spectacles on the spectacle frame holding member is cumbersome. In the right/left determination apparatus (2), when a lens which is not fitted in a frame of spectacles is measured, the projecting lever-like contact portion of the microswitch disturbs measurement. Even when lenses fitted in the frame are measured, if temples of spectacles extend not to be perpendicular to an eye-rim but to be slightly folded, they cause an erroneous operation. In addition, an erroneous operation may be caused upon contact of a hand or foreign matter.

The right/left determination apparatus (3) has a relatively easy-to-use arrangement as compared to those of the right/left determination apparatuses (1) and (2) However, since eye-rims have various shapes, it is difficult to specify a contact position of a contact plate with respect to an eye-rim. For this reason, some frames of spectacles cannot be subjected to right/left determination. When a large switch is employed to decrease probability of such difficulty in determination, the significance of the contact plate as the reference position is lost. To summarize, the conventional right/left determination apparatuses have complex structures.

SUMMARY OF THE INVENTION

It is an object of the present invention to provide a highly reliable automatic right/left determination apparatus for lenses of spectacles, which can solve the problems of the conventional apparatuses, requires no cumbersome operations, has a simple structure, and is free from an erroneous operation.

In order to achieve the above object, according to the present invention, a spectacle lens right/left determination apparatus used in an optical characteristic measurement apparatus for checking and measuring optical characteristics of spectacle lenses, comprises a contact plate which has contact surfaces which are brought into contact with an eye-rim of one spectacle lens to be measured and an eye-rim of the other spectacle lens not to be measured when the spectacle lens to be measured, whose central portion is mounted on and fixed to the optical characteristic measurement apparatus, is inserted in a measurement optical path of the optical characteristic measurement apparatus; a first strain sensor, fixed to the contact plate, for, when a left-eye lens is present on the measurement optical path and the eye-rim of a right-eye lens is brought into contact with the contact surface, detecting a strain of the contact plate; a second strain sensor, fixed to the contact plate, for, when the right-eye lens is present on the measurement optical path and the eye-rim of the left-eye lens is brought into contact with the contact surface, detecting a strain of the contact plate; and determination means for determining the right- or left-eye lens in the measurement optical path on the basis of the outputs from the first and second strain sensors.

Since the spectacle lens right/left determination apparatus according to the present invention has the above-mentioned arrangement, when a spectacle frame for holding lenses is urged against the contact plate to measure optical characteristics of one lens, the eye-rim of the other lens which is not subjected to measurement is brought into contact with a right or left wing portion of the contact plate. In this case, a small deviation (strain) of the contact plate caused by the contact pressure at that time is detected by the first or second strain sensor. Upon reception of the detection output, the determination means can reliably and easily determine the right or left lens present in the measurement optical path.

Other objects, features, and effects of the present invention will become apparent from the detailed description taken in conjunction with the accompanying drawings.

DESCRIPTION OF THE PREFERRED EMBODIMENTS

An embodiment of the present invention will be described hereinafter with reference to the accompanying drawings.

Figure 1:
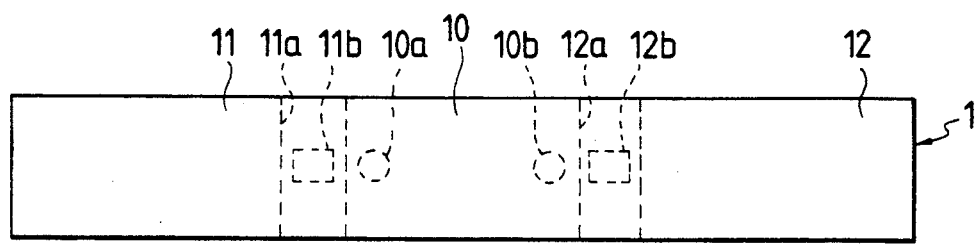
FIG. 1 is a front view of a contact plate portion as main part of a spectacle lens right/left determination apparatus according to an embodiment of the present invention.
Figure 2:
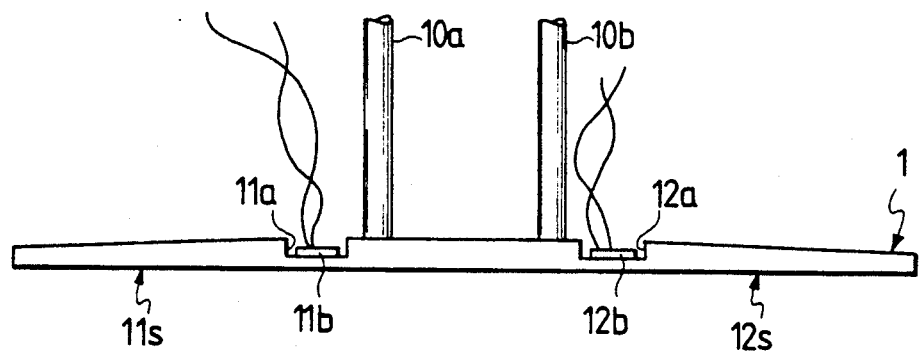
FIG. 2 is a top plan view of the contact plate portion shown in FIG. 1.

In FIGS. 1 and 2, a contact plate 1 has a central portion 10, and left and right wing portions 11 and 12. Legs 10a and 10b for aligning the contact plate 1 to a fixing portion 21 of a measurement apparatus 20 and detachably fixing the contact plate 1 to the fixing portion 21, as shown in FIG. 3, are arranged on the central portion 10.

The left wing portion 11 has a contact surface 11s which is brought into contact with a left eye-rim of a spectacle frame when the spectacle frame is brought into contact with the contact plate 1 so as to measure a right-eye lens of spectacles. A strain sensor 11b for detecting a strain produced in the left wing portion 11 is adhered to a notched groove 11a formed in a base portion of the left wing portion 11. The groove 11a is used to concentrate a stress of the left wing portion 11 to enhance the strain, thereby improving sensitivity of the strain sensor 11b.

The right wing portion 12 has a contact surface 12s which is brought into contact with a right eye-rim of the spectacle frame when the spectacle frame is brought into contact with the central portion 10 of the contact plate 1 so as to measure a left-eye lens of the spectacles. A strain sensor 12b for detecting a strain produced in the right wing portion 12 is adhered to a notched groove 12a formed in a base portion of the right wing portion 12. The groove 12a is similarly used to concentrate a stress of the right wing portion 12 to enhance the strain, thereby improving sensitivity of the strain sensor 12b.

Figure 3:
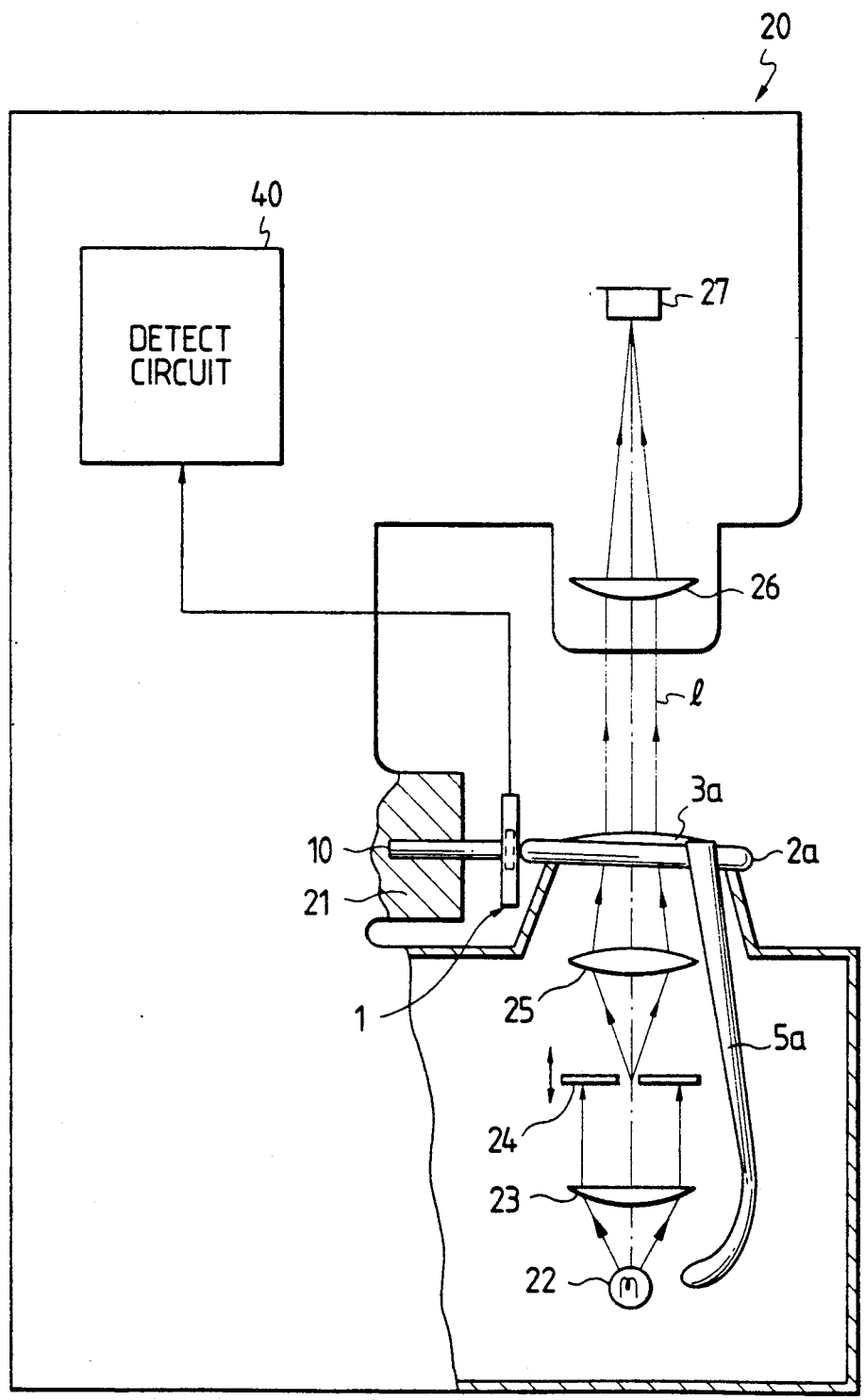
FIG. 3 is a schematic view of an optical characteristic measurement apparatus according to an embodiment of the present invention.

FIG. 3 shows a schematic arrangement of an apparatus for measuring optical characteristics of a lens (lens meter). The measurement apparatus 20 includes a light source 22, a condenser lens 23, a target 24 which is movable in an optical axis direction, a standard lens 25, and a focusing lens 26 for forming an image of the target 24 on a light-receiving element 27. A spectacle lens 3a to be measured is inserted on an optical path ( between the standard lens 25 and the focusing lens 26. The outputs from the strain sensors 11b and 12b are sent to a detect circuit 40 (to be described later), and whether a spectacle lens which is presently measured is a right or left one is determined on the basis of a change in resistance of the strain sensor 11b or 12b.

In this embodiment, spectacle lenses held by a conventional spectacle frame have been described. For so-called rimless spectacles, an edge of a lens is directly brought into contact with the contact plate, thereby determining a right or left spectacle lens. Therefore, regarding measurement of rimless spectacles, both an edge of a lens contacting the contact surface 11s of the contact plate 1 and a rim for holding the lens will be simply referred to as an "eye-rim" hereinafter.

Figure 4:
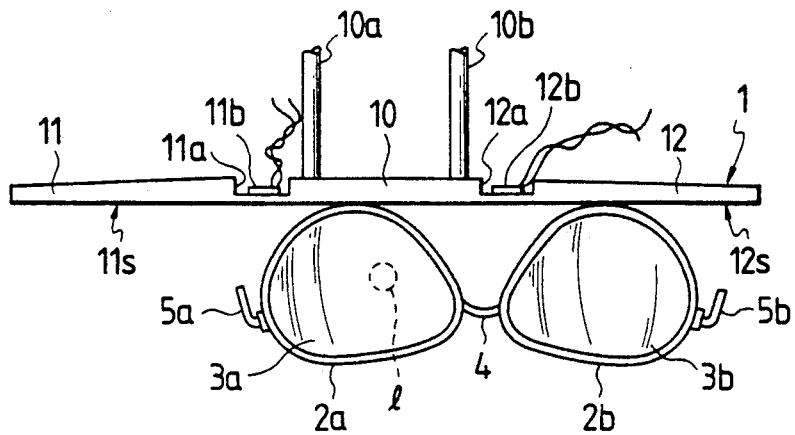
FIG. 4 is a view showing a state wherein a spectacle frame is brought into contact with the contact plate shown in FIG. 1.

The spectacle lens right/left determination apparatus according to the present invention has the above-mentioned arrangement. Therefore, when a left-eye lens 3a of spectacles is placed on the measurement optical path ( of the measurement apparatus 20, as shown in FIG. 4, an eye-rim 2b for holding a right-eye lens 3b contacts the contact surface 12s of the right wing portion 12 of the contact plate 1. Thus, the right wing portion 12 of the contact plate 1 receives a load from below in FIG. 4 by urging contact of a hand, and undergoes a slight curved deformation (i.e., is elastically strained). This slight deformation is particularly concentrated in the groove 12a of the contact plate 1. Thus, the strain sensor 12b comprising a resistive wire strain gauge or semiconductor strain gauge is deformed in a contract direction, and a change (a decrease in this case) in resistance of the sensor 12b occurs. If a displacement at the contact portion (upward on the drawing surface of FIG. 4) is represented by $\eta$ and a distance between the contact portion to a fulcrum of deformation is represented by h, we have:

$$\theta = \eta/h \tag{1}$$

then $$\Delta R = \kappa \cdot d\eta/2hm \tag{2}$$

(where $\Delta R$: the change in resistance, m: the gauge length, $\kappa$: the gauge ratio, d: the thickness of the contact plate)

If $\eta = 0.1$ (mm), $m = 2$ (mm), $h = 20.0$ (mm), $\kappa = 2.0$, and $d = 1.0$ (mm), a change in resistance is given by $-2.5 \times 10^{-3}$ (in this case, the contract direction of the sensor corresponds to a negative direction). An error caused by an inclination of a spectacle frame is 0.095° if a contact point distance of the left and right eye-rims 2a and 2b is assumed to be 60 (mm). Thus, the influence of a change in astigmatism angle is negligible.

Note that the same as in the above description applies to a case when the right-eye lens 3b is placed on the measurement optical path (, except that the eye-rim 2a for holding the left-eye lens 3a contacts the left wing portion 11 of the contact plate 1.

Note that in FIG. 4, reference numeral 4 designates a bridge of a spectacle frame, and reference numerals 5a and 5b designate temples.

Figure 5:
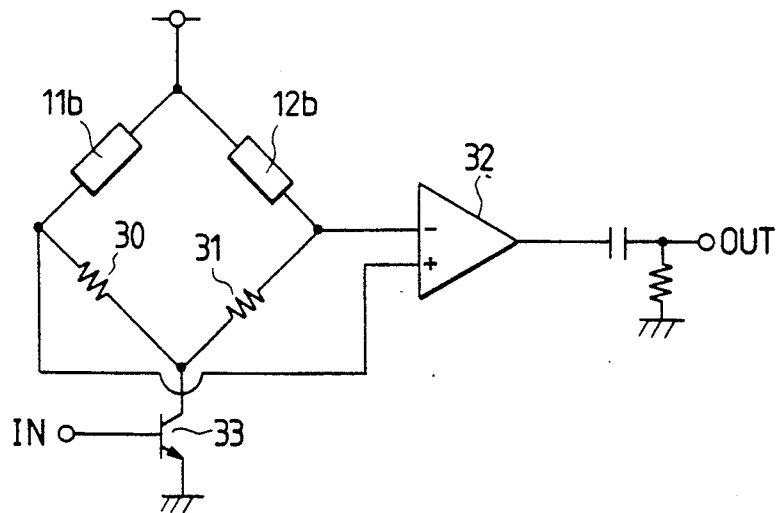
FIG. 5 is a circuit diagram for detecting a change in resistance of a strain sensor.
Figure 6:
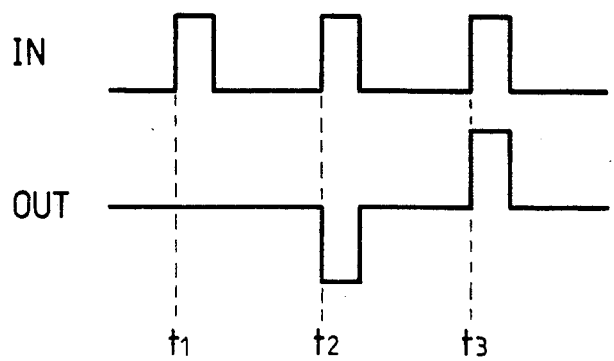
FIG. 6 is a timing chart for explaining an operation of a resistance change detect circuit shown in FIG. 5.

FIG. 5 shows an arrangement of the detect circuit 40 for detecting changes in resistances of the strain sensors 11b and 12b. A bridge circuit is constituted by the strain sensors 11b and 12b, and resistors 30 and 31 having the same resistance, and an output according to changes in resistances of the strain sensors 11b and 12b is amplified and detected by a differential amplifier 32. The output from the bridge circuit is fetched in synchronism with an ON operation of a transistor 33. An output signal (OUT) from the differential amplifier 32 becomes a three-value output, as shown in FIG. 6, depending on states of spectacle lenses. Thus, it can be determined whether the right or left lens is on the measurement optical path l or neither the right nor left lenses are set. More specifically, since the signal OUT is zero at time $t_1$, this indicates a state wherein no spectacle frame is set. At time $t_2$, since the signal OUT is negative, the resistance of the sensor 11b is decreased, and it can be determined that the right-eye lens 3b is present on the measurement optical path l. At time $t_3$, since the signal OUT is positive, the resistance of the sensor 12b is decreased, and it can be determined that the left-eye lens 3a is present on the measurement optical path l, as shown in FIG. 4. In the above embodiment, in order to improve sensitivity of the strain sensors 11b and 12b, the grooves 11a and 12a are formed in the contact plate 1. However, the grooves 11a and 12a need not always be required, and may be properly formed according to sensitivity of a strain gauge itself, a material of the contact plate 1, and the like.

As described above, according to the present invention, since the contact plate 1 can have a right/left determination function without adding a complex mechanism, the present invention can be easily realized, and can also provide an advantage in terms of cost. Even when the eye-rim of the frame of spectacles is brought into contact with any portion of the wing portions 11 and 12 of the contact plate, the contact state can be detected. Therefore, reliable determination can be attained regardless of the shapes of frames of spectacles. Furthermore, since a displacement of the wing portion upon contact is very small, there is no fear of an error in an astigmatism axis caused by a stroke of a switch unlike in the conventional right/left determination apparatus. Since a load of an operation can be determined by changing a gain or a threshold level of an electrical circuit constituting the determination means, a detection load which is free from an erroneous operation and can be reliably detected can be set.

What is claimed is:

1. An apparatus for measuring optical characteristics of spectacles, comprising:

a measurement optical system;

a contact plate member having a contact surface which can be simultaneously brought into contact with a pair of rims of said spectacles which are arranged so that optical axes of a pair of lenses fitted in said spectacles are substantially parallel to an optical axis of said measurement optical system;

detection means including a first sensor for, when one of said pair of lenses is placed on the optical axis of said measurement optical system, detecting a strain produced in said contact plate member, and a second sensor for, when the other of said pair of lenses is placed on the optical axis of said measurement optical system, detecting a strain produced in said contact plate member; and means, responsive to said detection means, for determining which one of said pair of lenses corresponds to a lens placed on the optical axis of said measurement optical system.

2. An apparatus according to claim 1, wherein each of said first and second sensors generates an output in response to a mechanical strain produced in said contact plate member.

3. An apparatus according to claim 1, wherein said first and second sensors are arranged at different positions of said contact plate member.

4. An apparatus according to claim 1, wherein said contact plate member includes:

a first contact surface which is brought into contact with one rim of said spectacles corresponding to said one lens when said one lens is placed on the optical axis of said measurement optical system;

a second contact surface which is brought into contact with the other rim of said spectacles corresponding to said other lens when said one lens is placed on the optical axis of said measurement optical system; and a third contact surface which is brought into contact with said one rim of said spectacles when said other lens is placed on the optical axis of said measurement optical system.

5. An apparatus according to claim 4, wherein said first sensor is arranged between said first and second contact surfaces on said contact plate member, and said second sensor is arranged between said first and third contact surfaces on said contact plate member.

6. An apparatus according to claim 5, wherein said first and second sensors comprise strain sensors fixed to said contact plate member.

7. An apparatus according to claim 1, wherein said contact surface of said contact plate member is arranged on a plane substantially parallel to the optical axis of said measurement optical system.

8. An apparatus according to claim 7, wherein the contact surface of said contact plate member includes a central portion and a pair of wing portions extending from two sides of said central portion, and when one rim of said spectacles is in contact with said central portion, the other rim of said spectacles is in contact with a corresponding one of said pair of wing portions.

9. An apparatus according to claim 8, wherein notched grooves are formed in said contact plate member at positions between one of said pair of wing portions and said central portion, and between said central portion and the other of said wing portions, and said first and second sensors are arranged in said notched grooves.

10. An apparatus according to claim 1, wherein each of said first and second sensors generates an output in response to a strain produced in said contact plate member, and said determination means includes means for comparing outputs from said first and second sensors.

11. An apparatus according to claim 10, wherein said comparison means includes a bridge circuit for receiving outputs from said first and second sensors.

* * * * *